May 3, 1955

D. FITCH 2,707,409

CHAIN SAW FILING FIXTURE

Filed Jan. 5, 1953

INVENTOR.
DUDLEY FITCH
BY
Beau, Brooks, Buckley & Beau,
ATTORNEYS.

United States Patent Office 2,707,409
Patented May 3, 1955

2,707,409

CHAIN SAW FILING FIXTURE

Dudley Fitch, Ransomville, N. Y.

Application January 5, 1953, Serial No. 329,668

4 Claims. (Cl. 76—31)

This invention relates to a holding, gauging and locating fixture for use in fitting the cutting edges of the teeth of chain saws or other saws having a similar tooth form and generally similar construction.

In the prior art various forms of apparatus and devices have been proposed for the general purpose of resharpening chain saw teeth. Such resharpening may be effected either by a power grinding operation or by manual filing. In the case of power grinding sharpening operations the apparatus involved is usually too complicated and too expensive for the average chain saw user. Further, the operation and manipulation of such apparatus is too complex and requires too high a degree of skill for successful use by farmers, woodcutters, and other usual and customary users of chain saws.

Prior art proposals along the line of chain saw filing fixture devices have been subject to a variety of objections, some of which are undue complexity, inadequate holding, positioning, gauging and indexing of the piece to be sharpened, and lack of sufficient flexibility to permit a given fixture to be used with various sizes, styles and cutting angles of chain saw teeth.

The present invention provides a fixture for use in filing the cutting edges of chain saw teeth and provides a device which may be used by operators with a minimum of familiarity with machinery or machine tools but which still gives accurate and fully satisfactory sharpening results in the hands of inexperienced users. The fixture of the present invention provides means for supporting a chain saw and for locating the teeth thereof along the fixture for successive tooth filing operations. The fixture further provides means for accurately guiding a hand file for correctly sharpening the chain saw tooth edges.

The locating means of the present invention is highly flexible in its nature in that it is adjustable to vary the depth or degree of filing and to accommodate teeth of different proportions and is readily reversible, the latter characteristic being important since chain saws conventionally have alternate teeth disposed in opposite directions. Further, the angle of filing is readily reversible to accompany a reversal in the direction of the teeth being sharpened and is likewise readily adjustable as to angularity to provide various tooth-cutting angles.

The specific example of the fixture of the present invention which is illustrated in the accompanying drawings and described in detail in the following specification is adapted particularly for the filing of chain saw teeth wherein the cutting edge comprises an arcuately extending chisel edge lying generally along the line of travel of the chain saw. In this particular application the filing is most effectively accomplished by the use of a circular file although the principles of the present invention contemplates the use of other forms of files when dealing with other tooth cutting edge contours.

While the present form of the invention is described and illustrated in conjunction with the filing of the teeth of so-called chisel tooth chain saws, the principles are as readily adaptable to the filing of straight or conventional tooth chain saws and, in fact, the same fixtures may be used for both purposes, both the tooth locating means and the file guiding and positioning means being adjustable through a sufficient range to accommodate the varying conditions incident to the filing of teeth of both of the above forms and to teeth of various sizes in such two forms.

Various modifications may be made in the apparatus without departing from the general principles of the invention, but a single specific embodiment is illustrated in the drawings and described in detail in the following specification by way of example. It is to be understood, however, that the principles of the invention are not limited to the particular mechanical embodiment illustrated and described, and that the scope of the invention is limited only as defined in the appended claims.

Figure 2:
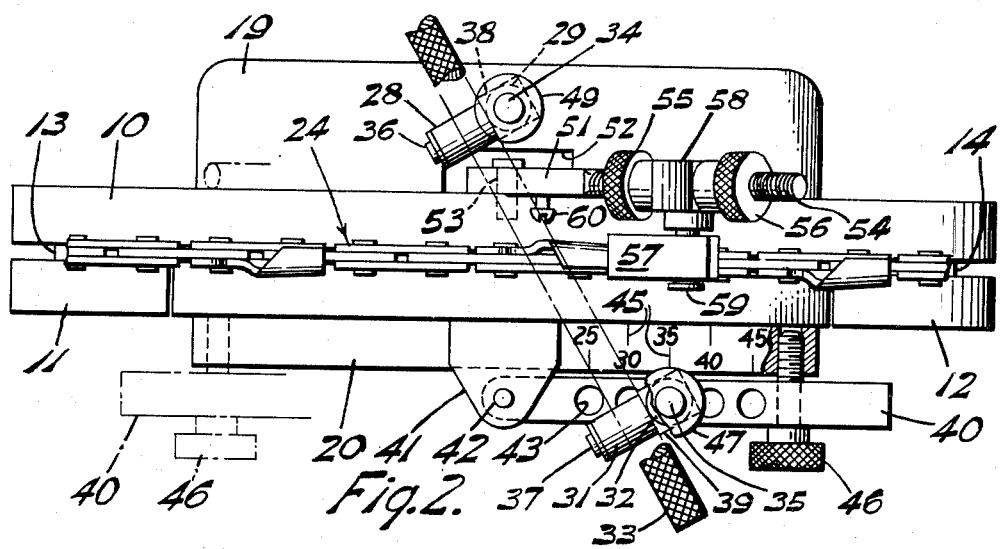
Fig. 2 is a general top plan view thereof.

Like characters of reference denote like parts throughout the several figures of the drawing and the numeral 10 designates a main body member in the form of an elongate block. A pair of end blocks 11 and 12 are fixed to the front face of main body member 10, there being intermediate smaller spacer blocks 13 and 14 with the result that the main body member 10 and the end blocks 11 and 12 cooperate to define an upper longitudinal groove for freely receiving tail portions of conventional chain saw tooth or link elements as shown clearly at the right-hand portion of Fig. 1.

Figure 3:
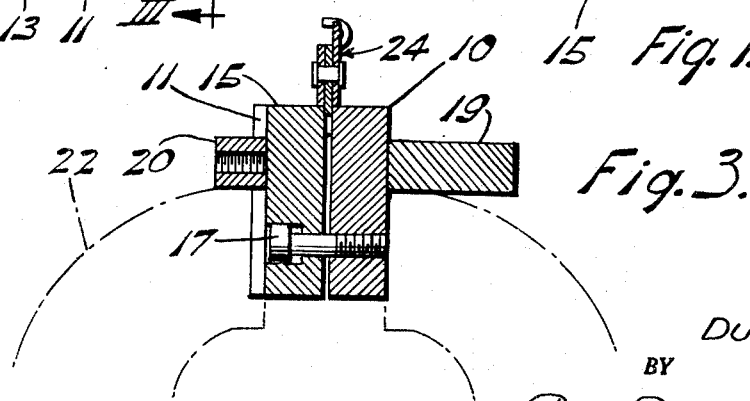
Fig. 3 is a cross-sectional view taken approximately on the line III—III of Fig. 1.

A clamping block or member 15 is disposed in the space between the end blocks 11 and 12 and is attached to main body member 10 in such manner that it has limited movement toward and away from the main body member. As shown in Fig. 3, screws 17 have their threaded shank portions fixed in the main body member 10 and their head portions are so proportioned as to limit movement of the clamp member 15 toward and away from the main body member 10.

A rail member 19 is fixed to the rear surface of main body member 10 and a somewhat similar rail member 20 is fixed to the front surface of clamp member 15 as shown clearly in Fig. 3, the rail members 19 and 20 provide longitudinal ledges by virtue of which the fixture may rest on the tops of the jaws of a conventional bench vise 22 with the intermediate portion of the main body member 10 and clamp member 15 depending between the jaws of the vise in such manner that they may be readily clamped thereby and thus clamp the tail portions of the teeth of a chain saw 24 between the upper edges of main body member 10 and clamp member 15.

Figure 1:
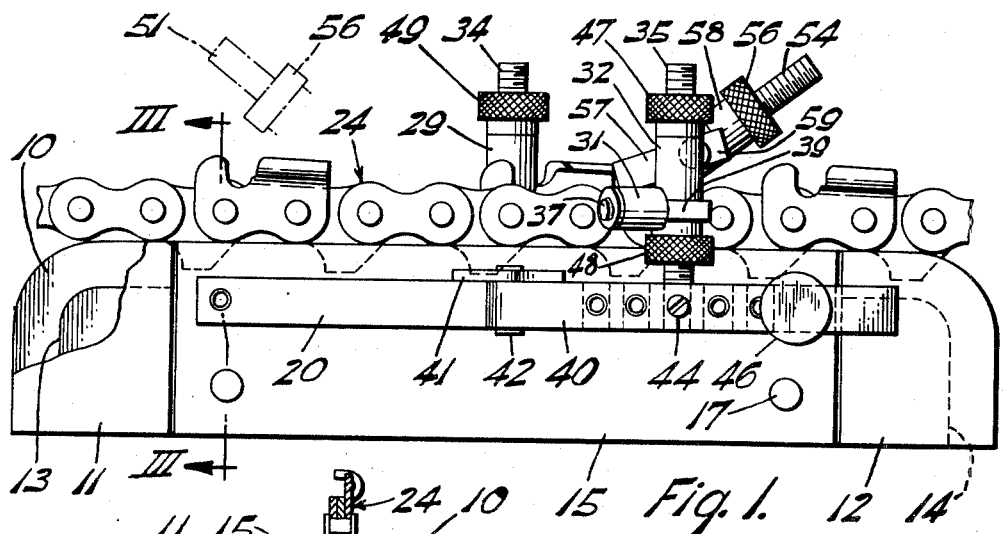
Fig. 1 is a general side elevational view of one form of the chain saw filing fixture of the present invention.

It will be noted from Figs. 1 and 3 that, with the chain thus positioned, its side plates, which include the cutting tooth elements themselves and the intervening connecting links, rest edgewise upon the upper surfaces of the main body member 10 and the clamping member 15 so that, when the latter two elements are clamped together by tightening movement of the vise, the chain 24 is held securely in both horizontal and vertical alinement. It will thus be seen that chain 24 may be shifted along the top of the fixture to adjust its longitudinal position or may, in fact, be entirely reversed in position, merely by loosening the jaws of the vise 22 to slightly release the pressure of the body member 10 and the clamping member 15 on the tail portions of the chain saw links.

The means for guiding a hand file in the process of filing one of the chain saw teeth comprises a rear pair of horizontal and vertical guide rollers designated 28 and 29, respectively, and a front pair of horizontal and vertical rollers designated 31 and 32, respectively. A hand file 33 is adapted to ride against these rollers in reciprocating filing movement as clearly illustrated in Fig. 2. The rear and front vertical rollers 29 and 32 are rotatably mounted on vertical bearing pins designated 34 and 35, respectively. Horizontal rollers 28 and 31 have bearing pins 36 and 37 which terminate in bearing portions 38 and 39, respectively, which are disposed on the bearing pins 34 and 35 immediately below the vertical rollers.

The lower end of bearing pin 34 is fixed in rear rail 19 in any desired manner as by means of a setscrew or the like (not shown). The front bearing pin 35 is similarly positioned on a bar or arm 40 which is pivoted to a bracket 41 as at 42. Bracket 41 is fixed to or may be a part of front rail 20 of clamping member 15. Arm 40 is provided with a longitudinal series of vertical openings 43, any of which may accommodate the lower end of vertical bearing pin 35, the latter being selectively secured in any of the openings 43 by means of a setscrew 44. Thus, the bearing pin 35 may be shifted along arm 40 to vary the filing angle and if desired the top of rail 20 may be graduated as indicated generally at 45 in Fig. 2 to indicate the filing angle resulting when bearing pin 35 is disposed in any one of the series of openings 43 in arm 37.

The first step in reversing the filing angle is to release arm 40 for swinging movement by removing a shoulder screw 46 which passes freely through a suitable opening in arm 40 and threads into either end of rail 20. The reversed position of arm 40 is indicated fragmentarily in dot-and-dash lines in Fig. 2.

Vertical bearing pin 35 is threaded and is provided with a pair of upper and lower nuts 47 and 48 between which roller 32 and bearing portion 39 of horizontal roller 31 are retained. Manipulation of nuts 47 and 48 permits rollers 31 and 32 to be adjustably disposed at any desired elevation within established limits. Rear vertical pin 34 is provided with a similar pair of adjustable locating nuts, the upper nut being designated 49 in Figs. 1 and 2.

Reference will now be had to means which are providing for locating and holding individual teeth of the chain saw in position for filing in conjunction with the foregoing clamping means. A supporting arm for the locating means is designated 51 and is pivoted at its lower end against the rear face of main body member 10 for swinging movement in a vertical plane, the rear rail member 19 being notched for this purpose as indicated at 52 in Fig. 2. The pivot pin for arm 51 is designated 53 in Fig. 2. The outer portion of arm 51 is threaded as at 54 to receive a pair of locating and adjusting nuts 55 and 56.

A locating pawl 57 is pivoted to a sleeve 58 as at 59 in Figs. 1 and 2. It will be seen that axial threading movement of the nuts 55 and 56 along the threaded portion 54 of arm 51 permits sleeve 58 to be adjustably positioned and locked at any desired axial point along arm 51 within the limits of the threaded portion 54. A screw 60, threaded laterally into arm 51 as shown in Fig. 2, strikes the upper surface of main body member 10 to limit the angular movement of arm 51 on pivot 53 in either direction.

The locating means is shown in full lines in Figs. 1 and 2 in the proper position for locating teeth for filing when the file guide means are in the position likewise shown in full lines in Figs. 1 and 2. It will be noted that the locating pawl 57 backs up the teeth against the filing pressure thereagainst. The outer end of locating arm 51 is fragmentarily indicated in dot-and-dash lines in Fig. 1 in the opposite position of adjustment for filing the oppositely facing alternate teeth of the chain saw.

It is to be understood that after the teeth facing in one direction have been completely filed, this being every other tooth along the saw, the chain saw is reversed in position, the file guide means is reversed as previously described above, and the tooth locating means is swung over to an opposite position, all for the purpose of filing the intermediate or alternate oppositely facing teeth.

What is claimed is:

1. A chain saw filing fixture comprising a pair of generally parallel opposed clamp members adapted to clamp a chain saw longitudinally therebetween, a file guide device on one of said clamp members, an arm mounted upon the other of said clamp members for pivotal movement about a vertical axis transversely aligned with said file guide device and normally lying along said other clamp member, and a second file guide device mounted on said arm at a point spaced from said pivotal arm mounting whereby said file guide devices guide a hand file angularly across said chain saw, said arm being adapted to extend in reverse directions along said other guide device by pivotal movement on said vertical axis to reverse the filing angle, chain saw locating means comprising an arm pivoted to one of said clamp members for swinging movement in a vertical plane, and a locating member carried by said last mentioned arm outwardly of said pivotal connection whereby said arm may be swung to reverse the longitudinal position of said locating member upon reversal of said first mentioned arm.

2. A chain saw filing fixture comprising a pair of generally parallel opposed clamp members adapted to clamp a chain saw longitudinally therebetween, a file guide device on one of said clamp members, an arm mounted upon the other of said clamp members for pivotal movement about a vertical axis transversely aligned with said file guide device and normally lying along said other clamp member, and a second file guide device mounted on said arm at a point spaced from said pivotal arm mounting whereby said file guide devices guide a hand file angularly across said chain saw, said second file guide device being adjustable along said arm to vary the filing angle, said arm being adapted to extend in reverse directions along said other guide device by pivotal movement on said vertical axis to reverse the filing angle, chain saw locating means comprising an arm pivoted to one of said clamp members for swinging movement in a vertical plane, and a locating member carried by said last mentioned arm outwardly of said pivotal connection whereby said arm may be swung to reverse the longitudinal position of said locating member upon reversal of said first mentioned arm.

3. A chain saw filing fixture comprising a pair of generally parallel opposed clamp members adapted to clamp a chain saw longitudinally therebetween, a file guide device on one of said clamp members, an arm mounted upon the other of said clamp members for pivotal movement about a vertical axis transversely aligned with said file guide device and normally lying along said other clamp member, and a second file guide device mounted on said arm at a point spaced from said pivotal arm mounting whereby said filed guide devices guide a hand file angularly across said chain saw, said arm being adapted to extend in reverse directions along said other guide device by pivotal movement on said vertical axis to reverse the filing angle.

4. A chain saw filing fixture comprising a pair of generally parallel opposed clamp members adapted to clamp a chain saw longitudinally therebetween, a file guide device on one of said clamp members, an arm mounted upon the other of said clamp members for pivotal movement about a vertical axis transversely aligned with said file guide device and normally lying along said other clamp member, and a second file guide device mounted on said arm at a point spaced from said pivotal arm mounting whereby said file guide devices guide a hand file angularly across said chain saw, said second file guide device being adjustable along said arm to vary the filing angle, said arm being adapted to extend in reverse directions along said other guide device by pivotal movement on said vertical axis to reverse the filing angle.

References Cited in the file of this patent

UNITED STATES PATENTS

| | | |
|---|---|---|
| 189,534 | Walsh | Apr. 10, 1877 |
| 758,551 | Merwine | Apr. 26, 1904 |
| 924,134 | Blankenburg | June 8, 1909 |
| 2,318,456 | Blum | May 4, 1943 |
| 2,429,292 | Ouellet | Oct. 21, 1947 |
| 2,458,058 | Carrol | Jan. 4, 1949 |
| 2,459,233 | Mall | Jan. 18, 1949 |
| 2,627,191 | Parr | Feb. 3, 1953 |